Oct. 17, 1961  J. S. NIELSEN ET AL  3,004,477
TUBE ROUTING MACHINE

Filed Jan. 8, 1959  3 Sheets-Sheet 1

INVENTORS.
JAMES S. NIELSEN
BY ALBERT M. RANKIN
ATTORNEY

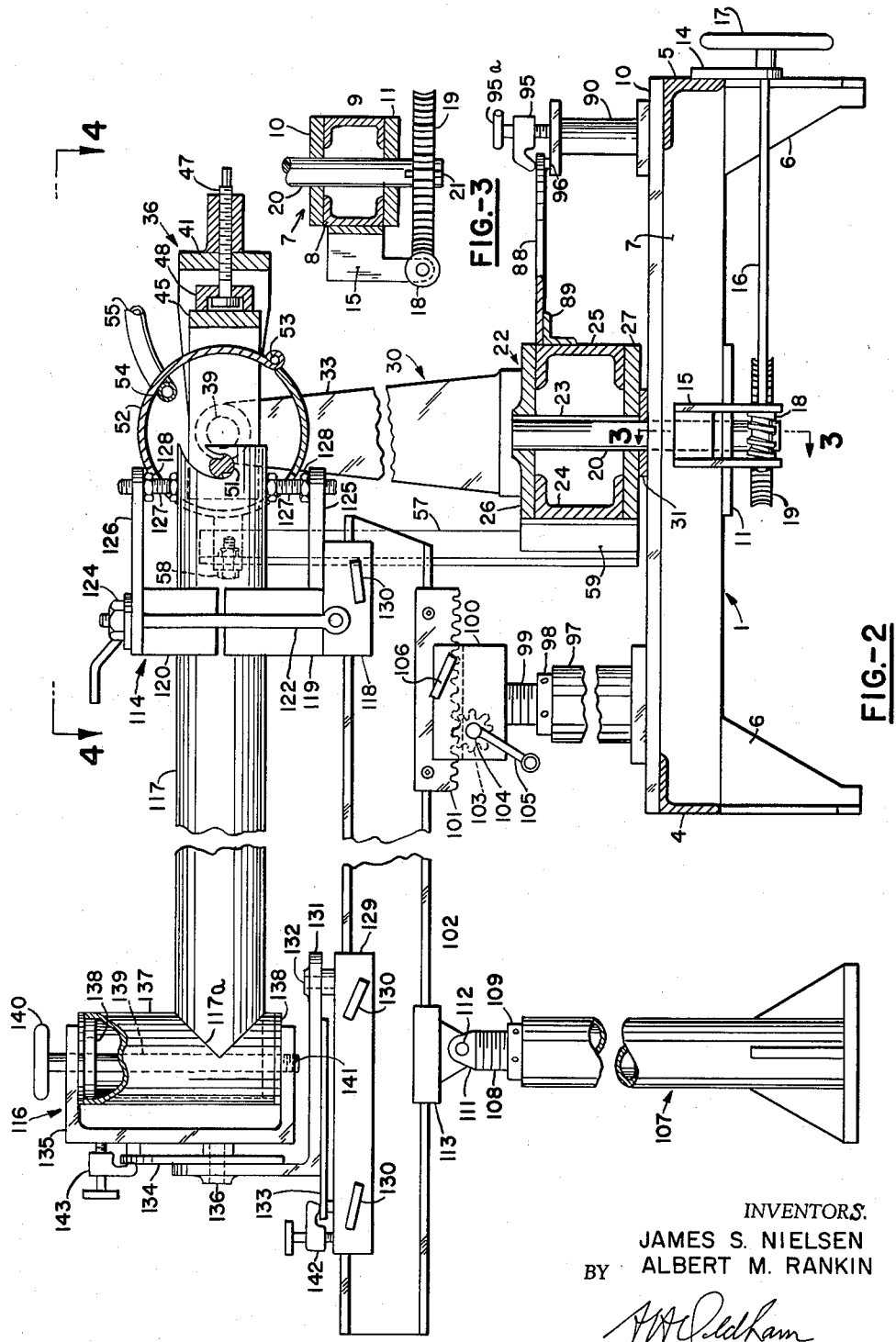

Oct. 17, 1961   J. S. NIELSEN ET AL   3,004,477
TUBE ROUTING MACHINE
Filed Jan. 8, 1959   3 Sheets-Sheet 3
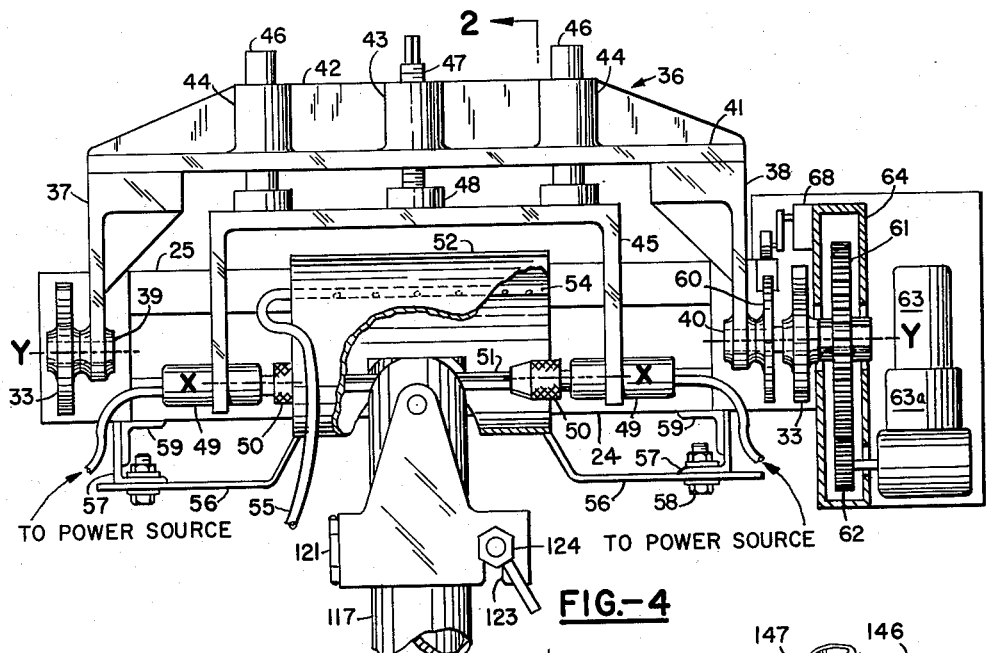
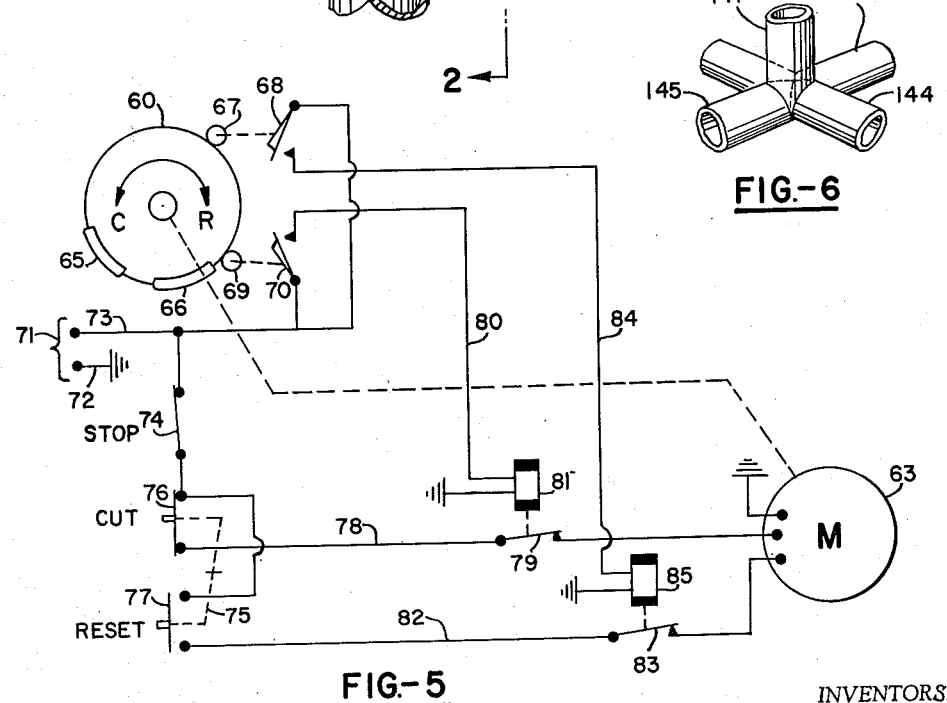
INVENTORS.
JAMES S. NIELSEN
ALBERT M. RANKIN
BY
ATTORNEY United States Patent Office 3,004,477
Patented Oct. 17, 1961

3,004,477
TUBE ROUTING MACHINE
James S. Nielsen, Wadsworth, and Albert M. Rankin, Akron, Ohio, assignors to Goodyear Aircraft Corporation, Akron, Ohio, a corporation of Delaware
Filed Jan. 8, 1959, Ser. No. 789,225
11 Claims. (Cl. 90—15)

This invention relates generally to routing machines and more particularly to a machine to contour surfaces along transition areas of merging structural pieces.

When two or more structural units are to be joined along portions of their surface it is necessary that the portions to be joined have matching contours which will allow them to fit snugly and evenly along the surfaces to be joined. This snugness is especially desirable when joining is to be accomplished by welding; large gaps due to misfit being difficult to fill in with weld metal and closer overall size control can be had. Such fitting of transition areas has been done mainly manually in the past. This invention is directed to the problem of accurately and expediently forming such transition areas.

An object of this invention is to provide a machine which will perform the operation of contouring the ends of tubular members to adapt them to join with a portion of another tubular member.

Another object of this invention is to provide a contouring machine which is easily adjusted to make a cut of cylindrical contour of any desired radius.

A further object of this invention is to provide a contouring machine which is easily adjusted to cut a cylindrical contour at any given angle relative to the longitudinal axis of the tube.

Still another object of this invention is to provide a machine which will afford compound cylindrical cuts at the ends of tubular members to permit a number of tubes to converge at a given location along the periphery of a tube.

Yet a further object of this invention is to provide a machine which will, in one cutting operation, perform a concave or convex cut of a predetermined radius on a tube of a predetermined diameter at a predetermined angle relative to the axis of the tube.

Still further another object of this invention is to provide a relatively simple, inexpensive, easily operated machine of durable and substantially maintenance free life for rapidly and substantially automatically contouring the ends of tubular members and characterized by ease of adjustment and operation and which when set at the desired radius and angle of cut, will contour any number of tubes with a minimum amount of manual control.

Other objects and advantages of this invention will become apparent hereinafter as the description proceeds; the novel features, arrangements and combinations being clearly delineated in the specifications and in the claims thereunto appended.

In the drawings:

FIG. 2 is side view of the machine with portions broken away at 2—2 of FIG. 4 to show details of certain parts of the machine;

FIG. 3 is a sectional view taken at 3—3 of FIG. 2;

FIG. 4 is a fragmentary top view taken at 4—4 of FIG. 2;

FIG. 5 is a wiring diagram showing the circuitry and electrical controls of the machine; and FIG. 6 is a view of a typical arrangement of tubes such as can be contoured with the machine of the invention.

Figure 1:
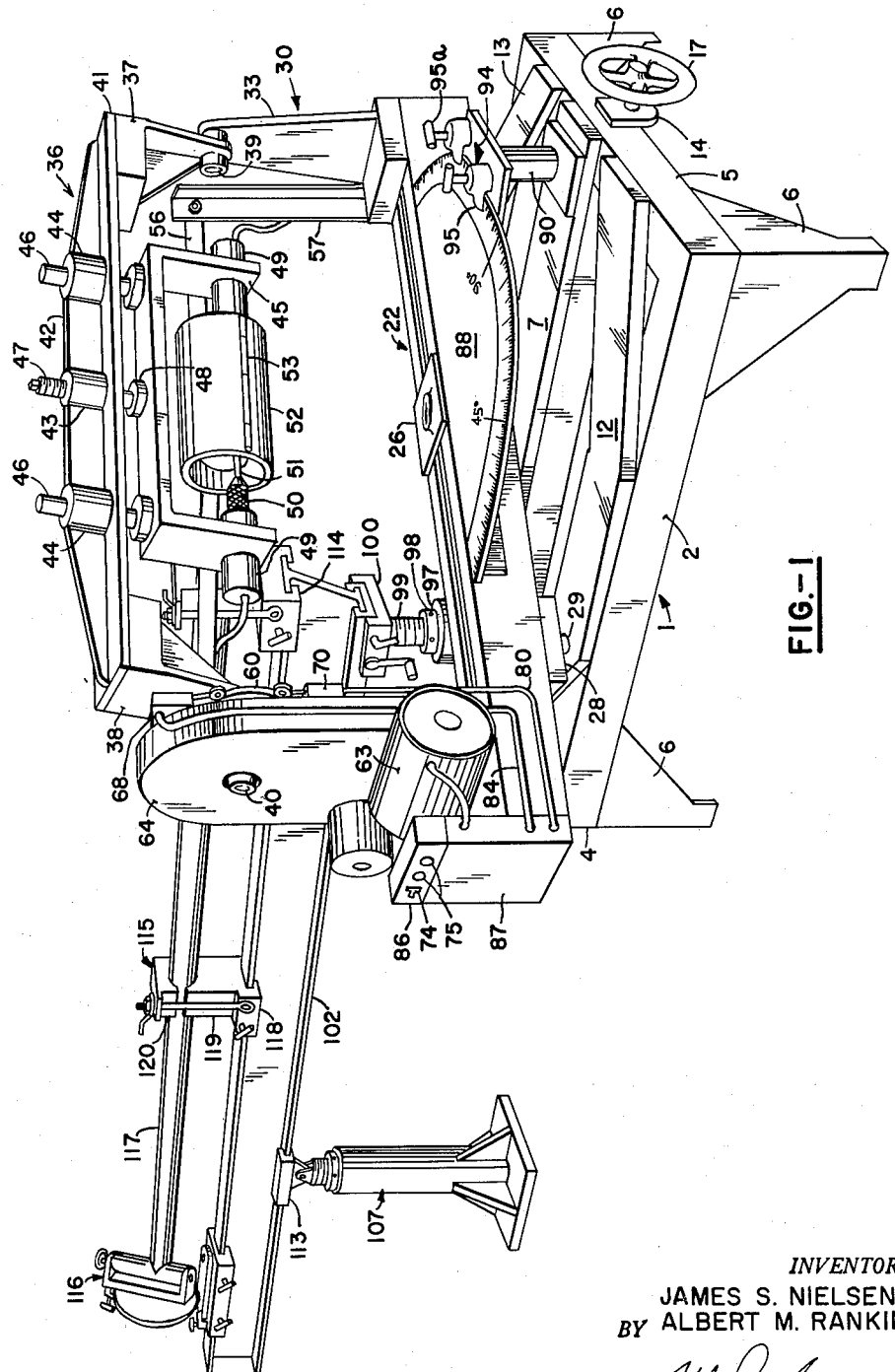
FIG. 1 is a perspective view of the machine of the invention.

As shown in FIGS. 1 and 2, a rectangular frame, indicated generally by the numeral 1, is made by welding together a pair of side angles 2 and 3 and a pair of end angles 4 and 5. The frame 1 is supported by legs 6 located at each corner thereof. A center beam, generally shown at 7, is located midway between and parallel to the side angles 2 and 3 and is welded at one end of the end angle 4 and at the opposite end to end angle 5.

As shown in FIG. 3, the center beam 7 consists of a pair of C-channels 8 and 9 placed between a top plate 10 of substantially the same length as the channels 8 and 9, and a bottom plate 11 of a substantially shorter length than the channels 8 and 9. The top and bottom plates 10 and 11 are welded to the legs of the C-channels 8 and 9 to form a boxed beam member, which in turn is welded at the ends thereof to the end angles 4 and 5 of the frame 1 as previously described.

A plate 12 is welded to the top of the frame 1 on one side of the center beam 7 and a plate 13 is welded to the top of the frame 1 on the opposite side of the center beam 7. A shaft bracket 14 is welded to the outside face of the vertical leg of the angle 5. A gear bracket 15 is welded to the center beam 7 near the mid point of the channel 8. A shaft 16 is supported at one end by the gear bracket 15 and at the opposite end by the shaft bracket 14, and, at one end extends through the shaft bracket 14 to receive a handwheel 17 which may be keyed to the shaft 16 or fastened by any suitable means. At the other end of the shaft 16 is keyed a worm 18, the shaft 16 passing therethrough and being supported at its end by the gear bracket 15. As shown in FIGS. 2 and 3 the worm 18 meshes with a worm gear 19 which is keyed to one end of a vertical shaft 20 by a key 21. The vertical shaft 20 extends through openings in the top plate 10 and in the bottom plate 11 of the center beam 7.

A beam 22, indicated as a whole at 22, which is similar in cross section to the center beam 7, is keyed to the vertical shaft 20 by a key 23 at the end portion of the shaft 20 which extends above the center beam 7. The beam 22 consists of a pair of C-channels 24 and 25 connected in spaced parallel relationship and with the web of each channel forming the vertical sides of the beam and with one leg of each channel extending inwardly in a horizontal plane at the top of the beam 22 and the remaining leg of each channel extending inwardly in a horizontal plane at the bottom of the beam 22. As shown in FIG. 2 a top plate 26 of approximately square shape, is welded at the center point and on the upper surface of the channels 24 and 25 and a similar bottom plate 27 is welded at the center point and on the bottom surface of the channels 24 and 25. The top plate 26 and the bottom plate 27 both form a part of the beam 22 and aid in joining the channels 24 and 25 in a fixed parallel relationship. As shown in FIG. 1, a pair of plates 28, one of which is welded to each end of the beam 22 at the bottom surface of the channels 24 and 25, also aid in connecting the channels to form the beam 22. Welded to the bottom of the plates 28 are supporting pads 29 which ride on the plates 12 and 13 when the beam 22 is rotated by the shaft 20 as will be hereinafter described.

The beam 22 forms a part of a U-frame generally designated by the numeral 30. The U-frame 30 can be rotated on the base about the vertical axis of the shaft 20 and can be set at a given angle relative to the base. A supporting bearing washer 31 is located on the shaft 20 between the beam 7 and the beam 22. The U-frame 30 best shown in FIGS. 1 and 4, consists of the beam 22, a bracket 32 attached to the top of one end of the beam 22 and a bracket 33 attached to the opposite end of the beam.

The U-frame 30 pivotally supports a trunnion frame, indicated in its entirety by the numeral 36, and consisting of a pair of trunnion brackets 37 and 38 which are pivotly connected to the brackets 33 respectively by trunnion pivot pins 39 and 40 normally fixed to the brackets 37 and 38. Completing the trunnion frame 36 a plate 41 is welded at each end thereof to the trunnion brackets 37 and 38, and a strengthening web 42 is welded to the plate 41 perpendicular and along the longitudinal center of the plate. A boss 43 is located at the center of the web 42 and has a threaded hole which extends through the plate 41. A pair of bosses 44 are located equidistant from the boss 43 along the web 42. The bosses 44 both have holes in alignment with holes extending through the plate 41.

Adjustably mounted on the trunnion frame 36 is a U-shaped yoke 45 which has a pair of guide dowels 46 fixedly attached thereto which slidably engage the bosses 44. As best may be seen in FIG. 2, an adjusting screw 47 is attached to the yoke 45 by a retaining cap 48 which permits rotation of the screw 47. The screw 47 engages the threaded portion of the boss 43, thereby providing for adjustment between the trunnion frame 36 and the yoke 45 by rotating the screw 47. A pair of motors 49, such as air motors connected to a power source (not shown) are mounted in axial alignment on each leg of the yoke 45 with inwardly facing chucks 50 removably holding therebetween a twin-shank rotary cutting tool 51 which is a fluted cylindrical rotary mill. The cutting tool 51 has two diametrically opposite cutting edges running longitudinally of the mill and parallel to the rotational axis of the mill. The motors 49 must run in opposite directions to drive the tool 51 in the same direction. It will be understood that other cutting means such as a grinder may also be used.

A cylindrical cutter shield 52 surrounds the cutting tool 51 and has a hinge 53 which joins the upper and lower section of the shield 52. The upper section of the shield may be opened to facilitate changing of the cutting tool and making necessary alignments of the cutting tool and the tube stock. The shield has an opening situated at a location on its periphery (FIG. 2) allowing the tube 117 to be machined to extend through the wall of the shield and lie in the path of the cutting tool 51. A perforated conduit 54 (FIG. 4) is mounted on the top interior of the cutter shield 52 along the length thereof to spray cooling lubricant on the cutting tool 51. A flexible supply tube 55 extends from the perforated tube 54 to a lubricant supply source (not shown). As shown in FIG. 4, the cutter shield 52 is welded at the bottom edge thereof to a pair of bent arms 56, each of which in turn is connected to a vertically disposed angle 57 by a bolt 58. The angles 57 are welded to brackets 59 which in turn are welded to the beam 22.

Now considering the manner of swinging the trunnion frame 36 in the U-frame 30 in order to obtain arcuate cutting movement of the tool 51, a cam disc 60 (FIG. 4) is keyed to the trunnion pin 40 for rotation therewith between the trunnion bracket 38 and the bracket 33. A spur gear 61 is keyed to the trunnion pin 40 at the end opposite the bracket 38. The spur gear 61 meshes with a spur gear 62 which is powered by a reversible motor 63 operating through a gear reducer 63a and mounted on the beam 22 of U-frame 30. A hood 64 covers the spur gears 61 and 62 and is attached to the beam 22. It will be seen that the trunnion frame 36 can thus be swung angularly in relation to the U-frame 30 upon operation of the motor 63.

It is the purpose of the cam disc 60 to control the extent of angular movement of the trunnion frame 36 in the U-frame 30 and this is achieved by providing a pair of dogs 65 and 66 (FIG. 5) adjustably attached to given locations on the periphery of the disc 60 and adapted to contact a roller 67 of a limit switch 68 and a roller 69 of a limit switch 70. As shown in FIG. 1 the limit switches 68 and 70 are mounted on the hood 64. Referring again to FIG. 5 the circuitry of the machine consists of terminals 71 adapted to be connected to a power source; one line 72 being grounded and the other side 73 supplying current through a normally-closed stop switch 74 to a maintained-contact switch 75 having bridging contacts 76 and 77.

Connected to the contact 76 is a line 78 leading through a normally closed switch 79 to the motor 63. When the limit switch 70 is closed it connects the line 73 to a line 80 which energizes a relay 81 to open the switch 79 and stop motor 63. Connected to the contact 77 is a line 82 leading through a normally closed switch 83 to the motor 63. When the limit switch 68 is closed it connects the line 73 to a line 84 which energizes a relay 85 to open the switch 83 and again stop the motor 63. The switches 74 and 75 are mounted in a switch box 86 and the relays 81 and 85 are mounted in a relay box 87. Both the switch box 86 and the relay box 87 are mounted on one end of the beam 22, as shown in FIG. 1. When the contact 76 is closed the motor 63 operates in one direction whereby the cutting tool 51 moves in a downward cutting arc through the work piece until stopped by operation of limit switch 70. When the contact 77 is closed the motor 63 operates in the reverse direction and the cutting tool 51 moves in an upward arc or resetting movement and stops under operation of limit switch 68 with the cutting tool 51 poised above the work piece ready to make another cutting arc through the work piece. The operation of the electrical controls will be hereinafter described in further details.

In order to position the U-frame 30 at a selected angle with the axis of the tube 117, and referring to FIGS. 1 and 2, a protractor 88 is secured to the channel 25 with the straight edge of the protractor abutting the channel 25 and the top face of the protractor in a horizontal position. A reinforcement angle 89 has one leg welded to the channel 25 and the other leg welded to the bottom face of the protractor 88. A pointer and clamp stand 90 is mounted on the top plate 10 of the center beam 7 near the forward end of the base 1. A pointer arrow 94 is located on the top face of the stand 90 to indicate the angular setting of the U-frame 30 by pointing to the marking on the protractor 88, and a pair of clamps 95 are mounted on the top of the clamp stand 90. A pad 96 is provided between the protractor 88 and the stand 90, and after the U-frame has been turned to a selected position the clamps 95 are tightened by turning T bolts 95a to grip the protractor 88 between the clamps 95 and the pad 96, thereby locking the U-frame at the selected angle.

Coming now to the supporting of a workpiece in the machine, a hollow cylindrical post 97 is mounted vertically on the top plate 10 of the center beam 7 on the end opposite the clamp stand 90. Mounted on the top end of the post 97 is an internally threaded adjusting ring 98 with threads engaging a threaded shank 99 which has one end fastened to a block 100 and the other end telescopingly received by the post 97. By rotating the adjusting ring 98 the block 100 may be raised or lowered. The block 100 has a longitudinal slot in the top to slidably receive a rack 101 which is fixedly attached to an I beam 102. A gear 103, having teeth which mesh with the teeth on the rack 101, is located within the block 100 on a shaft 104 which has a crank 105 attached to one end. A T-bolt 106 is threadably engaged with the block 100 and may be tightened to bear against the rack 101 to lock it within the block 100. The rack 101 and the I beam 102 can be moved longitudinally in either direction by loosening the T-bolt 106 and turning the crank 105 in the desired direction.

The aft end of the beam 102 is supported by a post 107 which engages the floor. The post 107 slidably receives a screw 108 carrying an adjustable collar 109. The screw 108 has a pivot bracket 111 attached to its upper end.

A pivot pin 112 connects the bracket 111 to a coupling block 113 which has a slotted portion that slideably receives the I beam 102. It will be seen that the beam 102, which is supported at the aft end by the post 107 and at the forward end by the adjustable post 97, when raised or lowered at the forward end will pivot at the pin 112, and when moved longitudinally by turning the crank 105 will slide in the coupling block 113. Adjusting screws 99 and 108 simultaneously will move beam 102 up or down in a position parallel to the floor.

Adjustably mounted on the upper flange of the I beam 102 is a hinged end clamp 114, at least one hinged intermediate clamp 115 and a back gage 116 which co-operatively hold a workpiece such as the tube 117 in a given position. The end clamp 114 and the intermediate clamps 115 have dovetail bases 118 which slidably engage the beam 102. A lower jaw 119 is mounted on the base 118 and is connected to an upper jaw 120 by a hinge 121 shown in FIG. 4. The lower jaw 119 and the upper jaw 120 are held in clamping position by a bolt 122 pivotaly connected at one end to the bottom jaw 119 and the opposite end engaging an open end slot 123 in the upper jaw 120. The bolt 122 has a hand nut 124 located on the threaded end which is tightened against the upper jaw to hold it in clamping position. The end clamp 114 is similar to the intermediate clamps 115 except that it has a triangular plate 125 attached to the forward side of the lower jaw 119 and a similar triangular plate 126 attached to the upper jaw 120. Both the plates 125 and 126 have an inwardly-facing adjustable screw 127 threaded through their forward tips to engage with and additionally support the end of the tube 117 adjacent tool 51. Both the screws 127 carry a lock nut 128.

The back gage 116 has a dovetail base 129 which slideably engages the top flange of the I-beam 102. The base 129 of the back gage 116 and the bases 118 of the clamps 114 and 115 have T-bolts 130 threaded therethrough in a location which will engage the I-beam 102 and clamp them in a given location along the beam 102. An L-shaped member 131 is pivotly connected to the base 129 by a pivot pin 132. A protractor 133 is fastened, in a horizontal position, to the underside of the horizontal leg of the L-member 131. A similar protractor 134 is fastened to the inner face of the vertical leg of the L-member 131. U-shaped bracket 135 is pivotly connected to the L-member 131 by a pivot pin 136. A section of tubing 137 is fitted with circular end plugs 138 and is mounted within the U-bracket 135 on a bolt 139 which passes through the end plugs 138 and is in axial alignment with the tube section 137. The bolt 139 has a hand knob 140 on one end and a threaded portion 141 on the opposite end. The bolt 139 is inserted through one leg of the U-bracket 135, through both end plugs 138 and is threaded into the opposite leg of the U-bracket 135. It will be seen that various sizes of tube sections and end plugs may be interchanged with the tube section 137 and the end plugs 138.

A clamp 142 mounted on the base 129 grips the protractor 133 and holds the L member 131 in selected angular adjustment about a vertical axis through the pin 132. The clamp 143 mounted on U-bracket 135 grips the protractor 134 and holds the U-bracket 135 in selected angular adjustment about a horizontal axis through the pivot pin 136. By rotating the L-member 131 about the pivot pin 132 and rotating the U-bracket 135 about the pivot pin 136 and by tightening the clamps 142 and 143 it will be seen that the tube section 137 may be adjusted about a vertical and a horizontal axis and may set at various given positions relative to the horizontal and vertical axes.

This arrangement is of particular advantage if the end of the tube 117 towards the gage 116 has already been contoured, as at 117a, to engage with another tube, such as tube section 137. The contour 117a can then be placed as shown against tube 137 and by the adjustment of tube 137 about the vertical and horizontal axes as heretofore described the other end of tube 117 can be properly positioned for exactly the cut desired in relation to the contour 117a.

FIG. 6 shows a typical arrangement of tubes such as may be contoured with the machine of the invention. This arrangement consists of a tube 144 engaged by tubes 145 and 146 having their ends contoured so as to smoothly fit against diametrically opposed sides of the tube 144 at right angles. Another tube 147 is contoured to engage the tubes 144, 145 and 146 vertical to the plane thereof with the longitudinal axes of all the tubes intersecting at a common point. Many other arrangements may be desired. For example it may be desired to join two cylindrical tubes whereby the longitudinal axis of the first tube is at a 90 degree angle to the longitudinal axis of the second tube; the first tube being joined at the central portion of the second tube. In such case it is necessary to contour the contacting end of the first tube to conform to the curvature. The tube 147 in FIG. 6 must be contoured to a compound curvature to conform to the radius of the tubes 144, 145 and 146. It may be desired to contour one end or both ends of a tube. When both ends of a tube are contoured the contours may have the same radius and angle of cut relative to the longitudinal axis of the tube or they may be different in one or more ways. It will be understood that solids and rectangular objects may also be contoured by this invention.

In operation of the machine, it will be understood that the cutting tool 51 should be in the "starting position" before placing the workpiece or tube 117 in the clamps 114 and 115 of the machine. In the "starting position," the major portions of the yoke 45 and the trunnion frame 36 are positioned below the trunnion pins 39 and 40. This positions the cutting tool 51 above the trunnion pins 39 and 40. From this position the cutting tool 51 will pass through the end of the tube in a downward cutting arc. FIG. 2 shows the cutting tool 51 making the downward cutting arc through the tube 117 and having already cut away a portion of the tube 117. If the cutting tool 51 is not in the "starting position" it may be moved to the "starting position" by pressing the "reset switch" which closes the contact 77 thereby permitting current to flow from the power source 71 through line 73, through the stop switch 74 and then through line 82 and switch 83 to operate the motor 63 to rotate trunnion frame 36 as shown in FIGS. 4 and 5.

After the cutting tool 51 is in "starting position" as described above, the tube 117 is placed in the end clamp 114 and in any intermediate clamps 115 which are being used. The back gage 116 is set at the desired location along the top flange of the I beam 102. The desired longitudinal position of the tube 117 is located by sliding the tube through the clamps 114 and 115 until one end of the tube abuts the tube section 137 on the back gage 116. If neither end of the tube 117 has been contoured the end of the tube 117 abutting the tube section 137 will lie in a plane perpendicular to the axis of the tube 117 and will form a tangent with the tube section 137. The back-gage 116 is set with the axis of the tube section 137 perpendicular to the longitudinal axis of the tube. The clamps 114 and 115 are closed and the hand nut 124 is tightened on each clamp causing the jaws 119 and 120 of each clamp to grip the tube firmly. The screws 127 which are threaded into the triangular plates 125 and 126 on the end clamp 114 are tightened against diametrically opposite sides of the tube 117 at the end of the tube which is to be contoured. These screws 127 provide additional support to the end of the tube 117 and prevent deflection of the tube 117 resulting from the force of the cutting tool 51 upon the tube during the cutting operation. The lock-nuts 128 on the screws 127 are tightened against the plates 125 and 126 to lock the screws 127 in position against the periphery of the tube 117.

If one end of the tube 117 has been contoured and it is also desired to contour the other end of the tube 117, the tube 117 is placed in the clamps 114 and 115 with the previously contoured end abutting the tube section 137 of the back gage 116 as shown in FIG. 2. The tube 137 should be of the correct diameter to conform to curvature of the contoured end of the tube 117. Also, by correct adjustment about a vertical axis through the pivot pin 132 and a horizontal axis through the pivot pin 136 the back gage 116 is set with the tube section 137 at an angle which matches the angle of cut of the contoured end of the tube 117 which abuts the tube section 137. The tube 117 may be clamped to the back gage by mounting a chuck or other clamping device on the U-shaped bracket 135, instead of the tube section 137. This is especially useful when it is necessary to index a tube to cut a multiple contour on one end with no contour cut on the opposite end. It will be understood that various sizes of clamp jaws may be used depending upon the size of tube being contoured. The end of the tube 117 which lies in the path of the cutting tool is raised or lowered relative to the cutting path by turning the adjusting ring 98 on the adjustable post 97 and/or adjusting ring 109 on post 107.

The U-frame 30 is set to perform the desired angle of cut on the tube 117 by turning the hand wheel 17 which simultaneously rotates the shaft 16 and the worm 18 which meshes with and turns the worm gear 19 causing the shaft 20 which is keyed thereto to rotate and move the beam 22 which keyed to the shaft 20. The U-frame 30 rotates wiht the beam 22 about a vertical axis through the shaft 20. The U-frame 30 is rotated until the protractor 88 indicates that the U-frame is set at the proper angle relative to the axis of the tube 117. For example, if it is desired to contour the end of the tube 117 to permit it to be joined to some given location on another tube with the axis of the tube 117 inclined at 45 degrees to the axis of the other tube, the U-frame is turned till the 45 degree line on the protractor 88 is in alignment with the pointer arrow 94 located on the clamp stand 90. When the clamps 95 are tightened by turning the T bolts 95a, the protractor 88 is gripped between the clamps 95 and the pads 96. Since the protractor 88 is rigidly attached to the U-frame 30, when the protractor 88 is set and held by the clamps 95 the U-frame is held in a fixed position at the desired cutting angle.

After the U-frame 30 is set at the desired angle the yoke 45 is adjusted to provide a proper cutting radius. At the beginning of the cutting operation the trunnion frame 36 and the yoke 45 mounted within the trunnion frame 36 extend downwardly from the trunnion pins 39 and 40 and the tube 117. The distance between the yoke 45 and the plate 41 of the trunnion frame 36 may be changed by turning the adjusting screw 47. Referring now to FIG. 4, when the distance is changed between the plate 41 and the yoke 45, the distance is also changed between an axis "X" which is the longitudinal axis of the cutting tool 51 and an axis "Y" through the center of the trunnion pins 39 and 40. The radius of the contour which is cut at the end of the tube 117 is equal to the distance between the axis "X" and the axis "Y" plus one half the diameter of the cutting tool 51. When a small radius cut is desired, the yoke 45 is moved toward the plate 41 of the trunnion frame 36 by turning the screw 47. This brings the axis "X" closer to the axis "Y" and thereby decreases the radius of the path traveled by the cutting tool 51. When a larger radius cut is desired, the yoke is moved away from the trunnion frame 36. This moves the axis "X" away from the axis "Y" and increases the radius of the path traveled by the cutting tool 51 during the cutting operation.

After the cutting tool 51 is in the "starting position," the machine is properly adjusted for the desired cut, and the tube 117 is properly located in the clamps 114 and 115, the motors 49 which rotate the cutter 51 are turned on and a flow of cutting lubricaant is introduced through the perforated tube 54 from the lubricant supply tube 55. The cutting cycle is started by closing the contact 76 of the maintained contact switch 75 shown in FIG. 5. When the contact 76 is closed, the current from the line 73 will flow through a line 78, through a normally-closed switch 79 to the motor 63 to operate the motor and thereby rotate the disc 60 in a cutting direction as shown by the arrow "C" on the disc 60, the disc 60 and the motor 63 being mechanically linked as shown in FIG. 4. The disc 60 rotates in the "C" direction until the dog 66 contacts the roller 69 and closes the limit switch 70 thereby ending the cutting cycle.

During the cutting cycle the cutting tool 51 rotates about its own longitudinal axis "X." Simultaneously the cutting tool 51 guided by the yoke 45 and the trunnion frame 36, moves in an arc about the axis "Y" with the axes "X" and "Y" remaining parallel to each other. The major portions of the trunnion frame 36 and the yoke 45 swing upwardly in an arc about the axis Y and the cutting tool 51 swings downwardly in an arc about the axis "Y" thereby forming a cylindrical contour through a desired portion of the work piece (tube 117). The trunnion frame 36, pivot pin 40, the cam disc 60, and the spur gear 61 are fixedly attached to each other and rotate simultaneously. When the dog 66 on the cam disc contacts the roller 69, the limit switch 70 closes permitting the current to flow from the power line 73 through the line 80 thereby actuating the relay 81, which opens the switch 79 and stops the motor 63. The tube 117 is then removed from the clamps 114 and 115 by loosening the hand nuts 124, swinging the bolt 122 out of the open end slot and opening the top jaw 120 at the hinge 121.

The reset switch is then pressed closing the contact 77 of the switch 75 and starting the motor 63 which returns the trunnion frame 36, the yoke 45 and the cutting tool 51 to the starting position. Before returning the cutting tool 51 to the starting position, it is possible to remove the contoured tube and insert another tube to be contoured on the upward or "reset" stroke of the cutting tool 51. Thus a tube may be contoured during either direction of travel of the trunnion frame 36. When the contact 77 is closed the current flows from the power line 73 through a line 82, and through a normally-closed switch 83 to the motor 63 causing it to operate and rotate the disc 60 in the "reset" or "R" direction shown by the arrow on the disc 60. The motor continues to operate until the dog 65 on the disc 60 contacts the roller 67 and closes the limit switch 68. This permits the current to flow from the power line 73 through the limit switch 68 and through a line 84 and thereby energizes a relay 85 to open the switch 83 and stop the motor 63. With the cutting tool 51 again in the "starting position," another tube 117 is then inserted in the clamps 114 and 115 and the cutting cycle is repeated by closing the contact 76 which again starts the motor 63 and causes the cutting tool 51 to make an arcuate downward cut through the tube 117.

When the machine is adjusted to cut a given length of tubing at a given angle and a given radius, no further adjustments are required unless there is a change in the tube size or in the radius or angle of cut to be made. When a compound curvature is required at the end of a tube such as the tube 147 in FIG. 6, the tube need not be removed from the clamps 114 and 115 after the first contour cut is made. By loosening the clamps the tube may be rotated a predetermined number of degrees about its own longitudinal axis until it is in the required position for the second contour cut. The protractor 134 on the back gage 116 provides accurate indexing of such rotation.

It will be understood of course that this invention could be used for contouring many types of objects and is shown as a tube contouring machine only as the best and most advantageous example of its operation. It is obvious to one skilled in the art that by minor variations in the clamping device and the cutter guide it would be possible to contour cylinders, rectangular solids and many other irregularly shaped solids and hollow objects. The apparatus of the invention could also cut convex contours as well as the concave contours shown herein.

Thus it may be seen that the objects of the invention have been accomplished and that the machine described will perform a great number of operations with a minimum number of adjustments which may be made quite easily.

While certain representative embodiments and details have been shown for the purpose of illustrating the invention, it will be apparent to those skilled in the art that various changes and modifications may be made therein without departing from the spirit or scope of the invention.

We claim:

1. Apparatus for cutting the end of a structural member to fit the periphery of another structural member at an angle and including a double shank rotary cutting tool, driving means for rotating the cutting tool attached to each end of the cutting tool, yoke means supporting the driving means, a trunnion frame for adjustably supporting the yoke means for movement toward and from the axes of the trunnion frame, a U-frame pivotally mounting at opposed ends thereof respectively opposed ends of the trunnion frame so as to support said trunnion frame, tool feeding means rigidly attached to the U-frame and adapted to swing the trunnion frame in the U-frame, means attached to the U-frame for angularly adjusting the U-frame in a plane parallel to the tool axis, and means for adjustably supporting a structural member in a cutting relation to the tool.

2. Apparatus for cutting the end of a structural member to fit the periphery of another structural member at an angle and including a U-frame, a trunnion frame, pivots supporting the trunnion frame in the U-frame, means carried by the U-frame to arcuately move the trunnion frame about the pivots in the U-frame, a yoke having parallel arms carried by the trunnion frame, a drive chuck carried by each arm of the yoke, the chucks opposed to each other and defining an axis parallel to the axis of the pivots supporting the trunnion frame in the U-frame, means adjustably mounting the yoke in the trunnion frame to position the axis of the opposed chucks at a selected radius from the axis of the pivots, a double shank cutting tool carried by the opposed chucks, power means mounted on the yoke for driving both chucks, mechanism for supporting a structural member to be cut with its end in cutting proximity to the tool, means in said mechanism for adjusting the axis of the structural member to or from the axis of the pivots, means in said mechanism for adjusting the structural member rotatively about its axis, means in said mechanism for adjusting the structural member lengthwise of its axis, and means for adjusting the U-frame so that the axis of the pivots supporting the trunnion frame is changed angularly with respect to the axis of the structural member.

3. Apparatus for cutting the end of a tube to fit the periphery of another tube at an angle and including a U-frame, a trunnion frame, pivots supporting the trunnion frame in the U-frame, means carried by the U-frame to arcuately move the trunnion frame about the pivots in the U-frame, a yoke having parallel arms carried by the trunnion frame, a drive chuck carried by each arm of the yoke, the chucks opposed to each other and defining an axis parallel to the axis of the pivots supporting the trunnion frame in the U-frame, means adjustably mounting the yoke in the trunnion frame to position the axis of the opposed chucks at a selected radius from the axis of the pivots, a double shank cutting tool carried by the opposed chucks, power means mounted on the yoke for driving both chucks, adjustable mechanism for supporting a tube to be cut with its end in cutting proximity to the tool, and means for adjusting the U-frame so that the axis of the pivots supporting the trunnion frame is changed angularly with respect to the axis of the tube.

4. Apparatus for cutting the end of a tube to fit the periphery of another tube at an angle and including a U-frame, a trunnion frame, pivots supporting the trunnion frame in the U-frame, means carried by the U-frame to arcuately move the trunnion frame about the pivots in the U-frame, a yoke carried by the trunnion frame, chuck means carried by the yoke and defining an axis parallel to the axis of the pivots supporting the trunnion frame in the U-frame, means for adjusting the yoke in the trunnion frame to position the axis of the chuck means at a selected radius from the axis of the pivots, a side milling tool carried by the chuck means, power means mounted on the yoke for driving the chuck means, adjustable mechanism for supporting a tube to be cut with its end in cutting proximity to the tool, and means for adjusting the U-frame so that the axis of the pivots supporting the trunnion frame is changed angularly with respect to the axis of the tube.

5. Apparatus for cutting the end of a tube to fit another tube at an angle and including a double shank rotary cutting tool, yoke means rotatably supporting the tool, means for driving both ends of the tool, a trunnion frame, a U-frame, opposed bearings supporting the trunnion frame in the U-frame, adjustable means mounting the yoke means in the trunnion frame so as to position the axis of the tool in alignment with the axis of the opposed bearings at selected radial distance therefrom, tool feeding means for angularly swinging the trunnion frame in the U-frame, means for adjustably supporting a tube in cutting relation to the tool, and means for angularly adjusting the U-frame in a plane parallel to the tool axis, and in a direction to change the angle of the tool axis with respect to the axis of the tube.

6. A tube contouring machine comprising a plurality of clamps in axial alignment to cooperatively support a tube in a predetermined horizontal position, a gage adjacent to and adapted to receive one end of the tube to locate the tube along its axis rotatively and longitudinally in a predetermined position in the clamps, a cutting tool rotatable about a first axis and adjacent to the other end of the tube to contour said end, a guiding assembly associated with the cutting tool to swing the cutting tool in a circular path about a second axis which is parallel to and equidistant from the first axis, enclosing means attached to the guiding assembly to surround the cutting tool, means mounted within said enclosing means to lubricate the contacting portions of the tube and the cutting tool during cutting, and means associated with the guide assembly to angularly adjust the first axis relative to the longitudinal axis of the tube.

7. A tube contouring machine comprising clamping means to support a tube in a predetermined position, a gage adjacent to and adapted to receive one end of the tube and locate the tube along its axis rotatively and longitudinally in a predetermined position in the clamping means, a cutting tool rotatable about a first axis and adjacent to the other end of the tube to contour said end, a guiding assembly associated with the cutting tool to swing the cutting tool in an arc about a second axis which is parallel to and adjustable to and from the first axis, and means associated with the cutting tool to angularly adjust the first axis of the cutting tool relative to the longitudinal axis of the tube.

8. A contouring machine comprising means to support a workpiece along an axis, means to circularly index the workpiece a predetermined number of degrees about said axis, side mill cutting means adjacent the supported workpiece to contour the workpiece, guide means associated with the cutting means to swing the axis of the cutting means in a circular path through the workpiece, means attached to the guide means for adjusting the radius of said circular path, and means connected to the guide means to adjust the relative angle between said axis of the workpiece and the axis of the cutting means.

9. A contouring machine comprising means to support a workpiece along an axis, side mill cutting means adjacent the supported workpiece to contour the workpiece, guide means asociated with the cutting means to swing the axis of the cutting means in a circular path through the workpiece, means attached to the guide means for adjusting the radius of said circular path, and means connected to the guide means to adjust the relative angle between said axis of the workpiece and the axis of the cutting means.

10. A tube contouring machine comprising clamping means to support a tube in a predetermined position, a gage adjacent to and operative to receive one end of the tube and locate the tube along its axis rotatively and longitudinally in a predetermined position of adjustment and in relation to the other end of the tube, cutting means adjacent to the other end of the tube to contour said end, and a guiding assembly to swing the cutting means in an arc about an axis having a predetermined angular relation to the longitudinal axis of the tube.

11. A tube contouring machine comprising a beam, a plurality of clamps arranged in alignment on the beam to cooperatively support a tube in a predetermined position, a cylinder removably mounted on one end of the beam and operative to engage a contoured end of the tube, means for tilting the cylinder to any selected angle in a plane perpendicular to the axis of the tube for angularly positioning of the tube about its axis, and a rotary cutting tool adjacent to and for contouring the other end of the tube.

References Cited in the file of this patent
UNITED STATES PATENTS

| | | |
|---|---|---|
| 1,414,970 | Nelson | May 2, 1922 |
| 2,059,753 | Scott et al. | Nov. 3, 1936 |
| 2,366,247 | Fauser | Jan. 2, 1945 |
| 2,408,521 | Lapointe | Oct. 1, 1946 |
| 2,510,820 | Hermanson | June 6, 1950 |
| 2,638,136 | Miller | May 12, 1953 |
| 2,923,207 | Pool et al. | Feb. 2, 1960 |
| 2,944,466 | Rohlfs | July 12, 1960 |